B. B. YOUMANS.
CUTTER ATTACHMENT FOR PLOWS.
APPLICATION FILED DEC. 18, 1919.
1,362,279.
Patented Dec. 14, 1920.
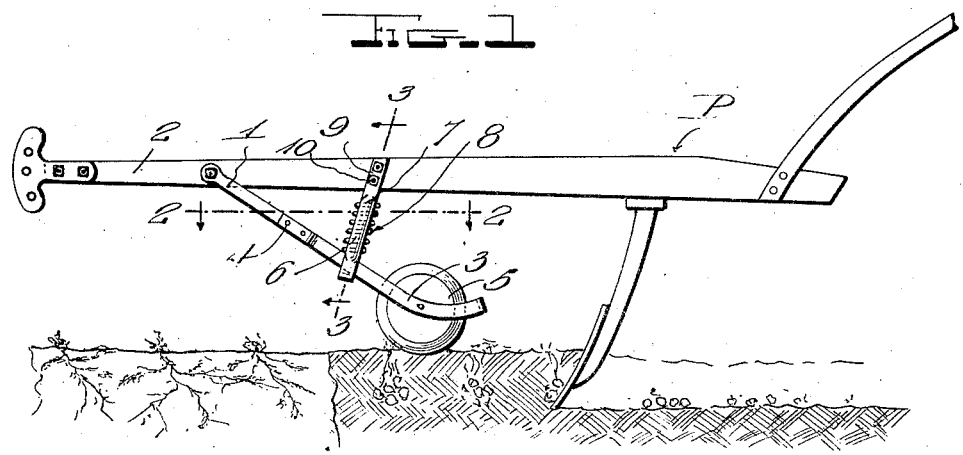
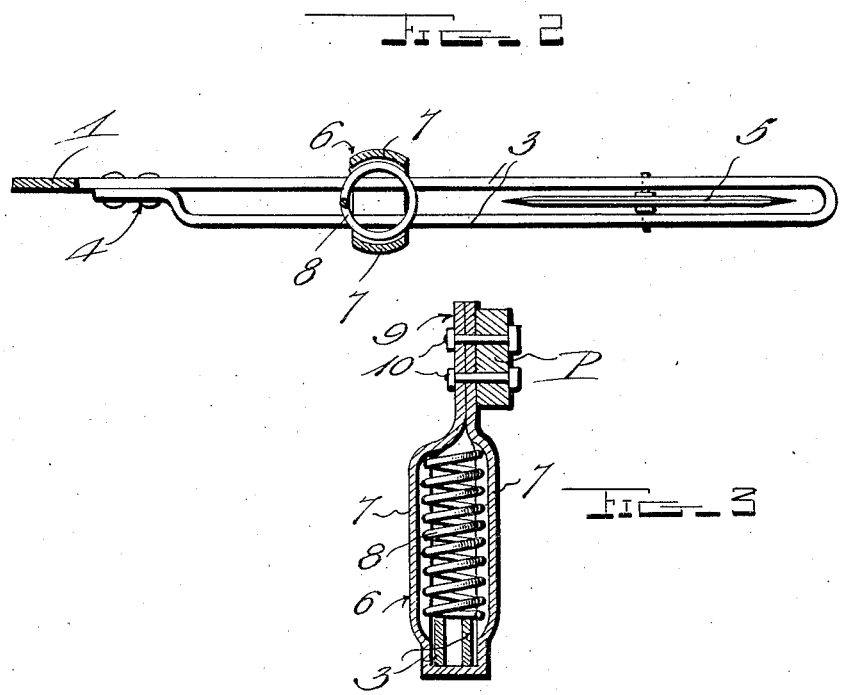
Inventor
Bartow B. Youmans
Witness
By H. B. Willson & Co.
Attorneys

UNITED STATES PATENT OFFICE.

BARTOW B. YOUMANS, OF COLLEGE PARK, GEORGIA, ASSIGNOR OF ONE-HALF TO CONOLUS Q. TRIMBLE, OF COLLEGE PARK, GEORGIA.

CUTTER ATTACHMENT FOR PLOWS.

1,362,279.  Specification of Letters Patent. Patented Dec. 14, 1920.

Application filed December 18, 1919. Serial No. 345,698.

*To all whom it may concern:*

Be it known that I, BARTOW B. YOUMANS, a citizen of the United States, residing at College Park, in the county of Fulton and State of Georgia, have invented certain new and useful Improvements in Cutter Attachments for Plows; and I do declare the following to be a full, clear, and exact description of the invention, such as will enable others skilled in the art to which it appertains to make and use the same.

This invention relates to improvements in vine-cutter attachments for plows.

The principal object is to provide a simple and practical device of this character which will be extremely simple in construction and operation.

With the above and other objects in view, the invention consists of certain novel features of construction and the combination and arrangement of parts as will be more fully described and claimed.

I attain these objects by the construction illustrated in the accompanying drawings, in which—

Figure 1, is a side elevation of a plow with my attachment mounted thereon;

Fig. 2, is a section on the line 2—2 of Fig. 1; and

Fig. 3, is an enlarged section on the line 3—3 of Fig. 1.

Similar reference numerals designate similar parts throughout the several views.

Reference is now had to the drawing, in which my attachment is illustrated mounted on a beam of a plow P.

A cutter carrying bar 1 is pivoted at one end to the plow beam 2 at a point in advance of the plow shovel, said bar being formed from a single length of metal, the free end of which is folded upon itself to form a pair of parallel spaced arms 3, whose free ends are curved laterally upward as shown in Fig. 1. The outer end of the bar is bent and riveted to the main body of said bar at 4. Disposed between the arms 3 is a rotary cutter disk 5 of ordinary construction.

For the purpose of holding the cutter and its supporting bar in proper position, I provide a loop 6 formed from a single length of metal which is bent upon itself, the arms 7 thereof being flat for a short distance and then curved transversely for a greater part of their length, forming a receiving space for a coil spring 8. The free end of the outer arm is bent laterally inward and then longitudinally to form with the other arm an attaching ear 9 through which is passed bolts 10 when the attachment is to be mounted on a plow beam.

The lower end of the loop forms a seat adapted to receive the cutter carrying bar, as shown in Fig. 1, said bar being pressed downwardly under the tension of the spring 8 and yieldably held in its lowermost position, the coil spring permitting upward movement of the bar and cutter only when an obstacle strikes the cutter. Although I have shown the plow provided with one of these attachments, it is very apparent that, since the two parts of the attachment have flat inner faces, a pair of said attachments may be mounted on the beam of a plow carrying two shovels.

From the foregoing description taken in connection with the accompanying drawing, the construction and operation of the invention will be clearly understood without requiring a more extended explanation.

Various changes in the form, proportion and minor details of construction may be resorted to without departing from the principle or sacrificing any of the advantages of the claimed invention.

I claim:

A vine cutter attachment for plows including a cutter carrying bar adapted to be pivoted at its forward end to a plow beam and inclined downwardly and rearwardly in advance of the plow, a cutter disk mounted on the free end of said bar, a rigid guide loop adapted to be secured to a plow beam, said loop surrounding an intermediate portion of said bar, and having its side arms bent to provide a bar receiving seat and above the seat bent longitudinally to provide arms arcuate in cross section, and a coil spring in said loop between the arcuate portions of the arms pressing against the bar to yieldably retain the cutter in its lowermost position.

In testimony whereof I have hereunto set my hand.

BARTOW B. YOUMANS.